UNITED STATES PATENT OFFICE.

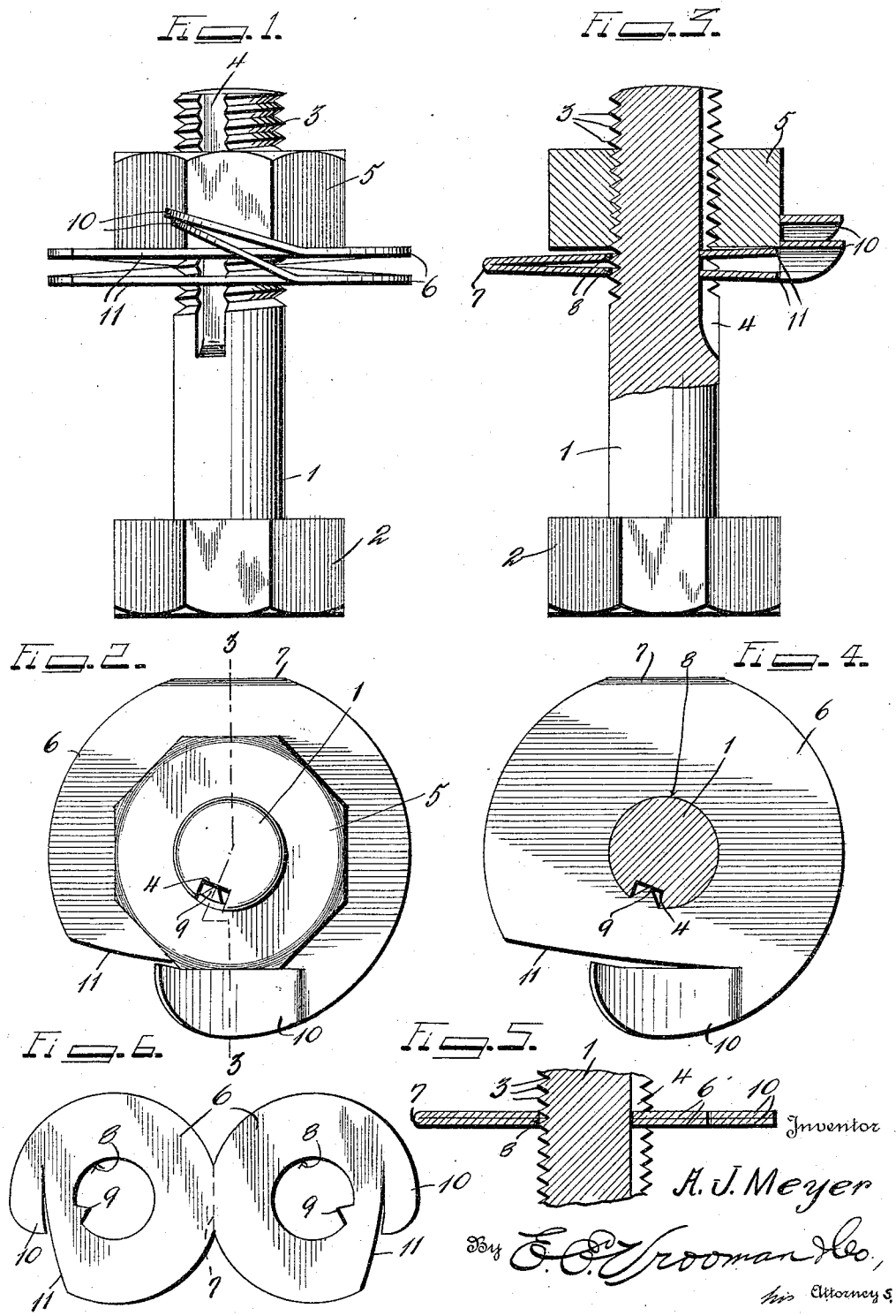

ALBERT J. MEYER, OF UNIONTOWN, WASHINGTON.

NUT-LOCK.

1,184,115.  Specification of Letters Patent. Patented May 23, 1916.

Application filed June 11, 1915. Serial No. 33,545.

*To all whom it may concern:*

Be it known that I, ALBERT J. MEYER, a citizen of the United States of America, residing at Uniontown, in the county of Whitman and State of Washington, have invented certain new and useful Improvements in Nut-Locks, of which the following is a specification, reference being had therein to the accompanying drawing.

This invention relates to a nut lock and has for its principal object the production of a simple and efficient means for positively retaining the nut in a locked set position upon the threaded portion of the bolt.

Another object of this invention is the production of a locking washer which is so constructed as to be mounted upon a bolt but which is provided with a simple and efficient means for retaining itself in a set position upon the bolt and at the same time locking the nut in a set position.

Another object of this invention is the production of a nut lock having a resilient washer which is constructed so as to bind upon the threads of a bolt when necessary for retaining the washer in engagement with the nut for locking the nut in a set position, this washer having its locking tongues so constructed as to prevent its accidental collapsing when in operation.

With these and other objects in view, this invention consists of certain novel combinations, constructions and arrangements of parts, as will be hereinafter fully described and claimed.

In the accompanying drawing: Figure 1 is a top plan view of the nut lock, as constructed in accordance with this invention, illustrating the same in use. Fig. 2 is a front elevation of the nut lock. Fig. 3 is a section taken on line 3—3 of Fig. 2. Fig. 4 is a vertical section through the nut lock, illustrating the manner in which the washer is carried on the bolt. Fig. 5 is a fragmentary sectional view through a portion of the bolt showing the locking washer in section and illustrating how the washer is compressed or collapsed for facilitating its removal. Fig. 6 is a plan view of the locking washer before the two sections thereof are bolted.

Referring to the accompanying drawing by numerals it will be seen that the nut lock comprises a bolt 1 having a fixed head 2 at one end and the threaded portions 3 contiguous to the opposite end thereof. A longitudinally extending groove 4 is formed in the bolt 1 so as to extend entirely through the threaded portions 3 thereof, as clearly shown in Figs. 1 and 3. The nut 5 which is used in connection with this device is of any ordinary construction and is adapted to be mounted upon the threaded portions 3 of the bolt 1 in the usual manner.

In order to lock the nut in a set position upon the threaded portions 3 of the bolt 1 so as to prevent its accidental displacement, there is provided a locking washer formed of a pair of sections 6. These sections are integrally connected together as shown at 7 whereby the two sections may be bolted together at their connected portions, as shown in Figs. 3 and 5. Each section 6 is provided with a central opening 8 having a pointed lug 9 formed thereon extending into each opening 8. The outer periphery of each section 6 is cut so as to provide a locking tongue 10 adjacent the beveled edge 11. Therefore, since the beveled edge 11 extends away from the locking tongue 10 adjacent the fixed end of the locking tongue, it will be seen that the tongue may be easily bent or sprung when necessary, in either direction.

When this device is in use, the two sections 6 of the locking washer are bent or sprung toward each other by bending along the connecting portions 7 as shown by the scored lines at this point. Since the locking washer is formed of resilient sheet metal the normal tendency of the two sections will be to spring apart or away from each other. When the two sections have been compressed into engagement with each other, throughout their entire side surfaces, as shown in Fig. 5, the bolt 1 may be passed through the central openings 8 while the inwardly extending pointed lugs 9 will move into the longitudinally extending groove 4 of the bolt. As soon as the washer has been moved to a desired position upon the bolt 1, it may be released so that the resiliency of the connecting portion 7 of the two sections 6 will cause the two sections to spring away from each other, as clearly shown in Figs. 1 and 3. Since the openings 8 formed in the sections 6 are of approximately the same diameter as the bolt 1, the springing apart of these sections will cause the vertical axis of the openings to spring or move from the transverse axis of the bolt 1, thereby causing the portions of the opening 8 to bind upon the threaded portions 3 of the bolt 1, thereby retaining the locking washer in a set position upon the bolt. It will further be seen that since the lugs 9 are pointed, they will also be forced into a biting or bonding action with the bolt 1 within the groove 4, thereby assisting in retaining the locking washer in a set position upon the bolt. The nut 5 may then be threaded upon the bolt until it comes into engagement with one of the sections 6 and then the locking tongue 10 of this section may be bent outwardly so as to fit over one of the side surfaces of the nut. When this locking tongue 10 is moved to the position shown in either of Figs. 1 or 2, it will be seen that the nut will be locked in a set position upon the threaded portions 3 of the bolt 1 since the lugs fitting within the groove will hold the locking washer against rotation and the locking tongue will in turn prevent the nut from rotating in either direction. The locking tongue 10 of the other section 6 may then be swung so as to overhang the nut 5 and engage the inner surface of the first-mentioned locking tongue. Therefore, the locking tongue which is last bent over will not only assist in retaining the nut against rotation, but will also reinforce the first locking tongue preventing the same from accidentally disengaging the nut, which would allow the nut to accidentally rotate. As clearly shown in Figs. 2 and 3, the beveled edge 11 of the two sections 6 of the locking washer is formed at a spaced distance from the locking tongues 10 and therefore will be positioned within the plane of the outer portion of the nut 5. Therefore, the locking tongues may be easily swung so as to engage the nut without danger of interference from the beveled edge 11.

From the foregoing description, it will be seen that a very simple and efficient nut lock has been produced wherein the locking washer is formed of a pair of resilient sections integrally connected together, so as to normally spring outwardly, thereby causing the sections to bind upon the threads of the bolt for retaining the washer in a set position, while the locking tongues may be bent so as to overhang the nut and retain the same in a set position, one locking tongue reinforcing the other and thereby preventing the locking tongues from disengaging the nuts, while the engagement of the tongues will also prevent the two sections from accidentally collapsing into engagement with each other and thereby allow the locking washer to disengage the nut.

It is of course obvious that if so desired, the locking washer may be positioned so as to engage any support through which the bolt passes, at which time the nut can be threaded upon the bolt so as to allow the tongues to be bent thereover for holding the nut in a set position, without departing from the spirit of this invention. It should, of course, be understood that it is intended to have this washer formed from spring or resilient steel whereby it will positively lock the nut without danger of accidentally folding to a compressed position while in use. It should also be understood that the tongues 10 may be constructed so as to always extend to one side portion of the two sections of the washer, thereby extending so as to overhang a nut threaded into engagement with the washer for locking the nut without necessitating manual springing or bending of the tongues.

What I claim is:—

1. In a nut lock of the class described, the combination of a bolt having a groove formed in its threaded portion, a locking washer comprising a pair of sections integrally connected together, said sections provided with openings, integral lugs formed upon said sections and extending into said openings, said sections being adapted to be compressed into engagement with each other, whereby said bolt may be forced through said openings and said lugs may pass into said grooves, at which time said sections may be freed so as to spring apart whereby the plane of the sections will extend out of the transverse plane of the bolt thereby causing said sections to bind upon the threaded portion of said bolt for holding said washer in a set position upon said bolt, a nut carried by said bolt and engaging said washer, a tongue formed upon said locking washer and overhanging said nut, whereby said nut will be held against accidental rotation, and means carried by one of said sections for preventing said sections from accidentally collapsing when in use.

2. In a nut lock of the class described, the combination of a bolt having a groove formed in its threaded portion, a locking washer comprising a pair of sections integrally connected together, said sections provided with openings, integral lugs formed upon said sections and extending into said openings, said sections being adapted to be compressed into engagement with each other, whereby said bolt may be passed through said openings and said lugs may pass into said grooves, at which time said sections may be freed so as to spring apart whereby the plane of the sections will extend out of the transverse plane of the bolt thereby causing said sections to bind upon the threaded portion of said bolt for holding said washer in a set position upon said bolt, a nut carried by said bolt and engaging said washer, a tongue formed upon each of said sections, one of said tongues fitting upon said nut for holding the nut against accidental rotation, the remaining tongue engaging said first-mentioned tongue, whereby said locking washer will be held from collapsing when in use.

In testimony whereof I hereunto affix my signature.

ALBERT J. MEYER.

Copies of this patent may be obtained for five cents each, by addressing the "Commissioner of Patents, Washington, D. C."